(12) United States Patent
Nakajima et al.

(10) Patent No.: US 7,106,362 B2
(45) Date of Patent: Sep. 12, 2006

(54) SEMICONDUCTOR INTEGRATED CIRCUIT AND ADJUSTMENT METHOD THEREOF

(75) Inventors: Kenichi Nakajima, Hanyu (JP); Hideo Imaizumi, Nita-machi (JP); Takuji Kato, Kumagaya (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 619 days.

(21) Appl. No.: 10/422,135

(22) Filed: Apr. 24, 2003

(65) Prior Publication Data

US 2003/0214587 A1    Nov. 20, 2003

(30) Foreign Application Priority Data

May 16, 2002    (JP)    ............................. 2002-141773

(51) Int. Cl.
*H04N 17/00*    (2006.01)
(52) U.S. Cl. ..................................... 348/189
(58) Field of Classification Search ................. 348/189
See application file for complete search history.

(56) References Cited

U.S. PATENT DOCUMENTS 4,277,797 A * 7/1981 Dangschat et al. ......... 348/189

\* cited by examiner

*Primary Examiner*—Evan Pert
(74) *Attorney, Agent, or Firm*—Fish & Richardson P.C.

(57) ABSTRACT

An electronic equipment manufacturer has been bearing the burden to adjust variations in characteristics of semiconductor integrated circuits according to a conventional art. The device and the method of this invention include a microcomputer, signal processing circuit which processes an input signal accordingly to a control signal from the microcomputer and provides an output signal and a memory which stores adjustment values to adjust changes in signal characteristics due to variations in manufacturing of elements composing the signal processing unit. The microcomputer adjusts the changes in the signal characteristics of the signal processing circuit according to the adjustment values stored in the memory.

12 Claims, 2 Drawing Sheets

SEMICONDUCTOR INTEGRATED CIRCUIT AND ADJUSTMENT METHOD THEREOF

BACKGROUND OF THE INVENTION

1. Field of the Invention

This invention relates to a semiconductor integrated circuit which can adjust its signal characteristics by itself when the characteristics fluctuate due to production variations, and to a method of the adjustment.

2. Description of the Related Art

When a semiconductor integrated circuit is produced with a semiconductor manufacturing process, it is common to have manufacturing variations in such as alignment of photomasks and width of an etched line. Characteristics of the semiconductor integrated circuit vary among semiconductor integrated circuits due to the manufacturing variations, even if they are from the same production lot or even from the same wafer.

For example, if the semiconductor integrated circuit includes an amplifier, the gain of the amplifier varies among the semiconductor integrated circuits. When the semiconductor integrated circuits are shipped to an electronic equipment manufacturer and mounted in electronic equipment, the characteristics of the equipment vary from unit to unit. With this being the situation, electronic equipment manufacturers used the semiconductor integrated circuits adjusting variations in the characteristics of the semiconductor integrated circuits themselves.

For example, a TV receiver manufacturer uses signal processing ICs which receive and demodulate video signals. The video signal processing ICs have various characteristics such as depth of color, tint, and brightness. Although these characteristics are modified to liking of the TV receiver manufacturer or of viewers, basic range of adjustment is determined by the manufacturer of the semiconductor integrated circuits. Each of the semiconductor integrated circuits needs to have the same basic range of adjustment. Otherwise, criteria of the adjustment to the electronic equipment would vary.

In reality, however, the characteristics vary among the semiconductor integrated circuits resulting from the variations in manufacturing of the semiconductor integrated circuits as described above. Thus, the TV receiver manufacturer have measured the variations in the characteristics of the semiconductor integrated circuits and adjusted them.

To explain more concretely, a TV receiver has a microcomputer and a memory. For example, depth of color is measured by an image scanner or by visual evaluation, and an adjustment signal is generated so that a center value of the color always has predetermined depth.

The adjustment signal value is calculated by the microcomputer and stored in the memory. Once stored in the memory, the adjustment signal is read from the memory by the microcomputer and applied to the video signal processing IC, every time the power supply of the TV receiver is turned on. By this means, always same amount of control can be applied to the TV receiver, whichever semiconductor integrated circuit is used as the video signal processing IC.

However, a problem is that the electronic equipment manufacturer, not the semiconductor integrated circuit manufacturer, has to make the adjustment of the variations in the semiconductor integrated circuits, bearing additional complication of adjustment processes in the production line.

SUMMARY OF THE INVENTION

The device and the method of this invention include a microcomputer, signal processing circuit which adjusts an input signal accordingly to a control signal from the microcomputer and provides an output signal and a memory which stores an adjustment value to adjust a change in signal characteristics due to the variations in manufacturing of elements composing the signal processing circuit, wherein the microcomputer adjusts the change in the signal characteristics of the signal processing circuit according to the adjustment value from the memory.

According to this invention, each of the signal processing circuits shows no variations due to the manufacturing in the outcome, since the memory storing the adjustment value and the signal processing circuit are combined together. Since the signal processing circuit shows no variations, the electronic equipment manufacturer gets no additional burden and can reduce the adjustment process in the production line.

DETAILED DESCRIPTION OF THE INVENTION

Figure 1:
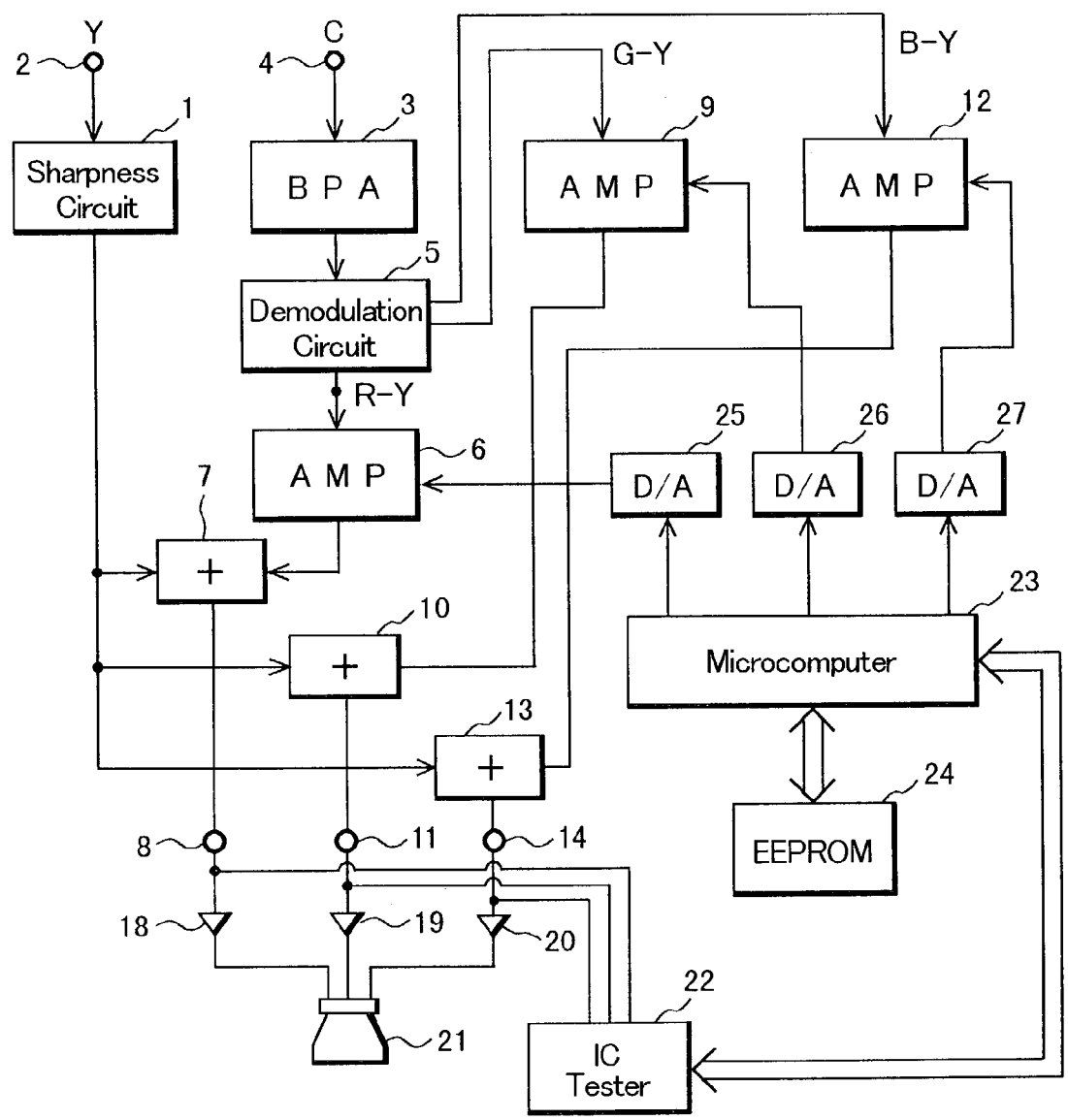
FIG. 1 is a block diagram showing a semiconductor integrated circuit according to an embodiment of this invention.

A semiconductor integrated circuit according to an embodiment of this invention will be explained referring to FIG. 1 hereinafter. As seen from FIG. 1, a sharpness circuit 1 adds sharpness to a brightness (Y) signal from a terminal 2, a band pass amplifier (BPA) 3 amplifies a chroma signal C from a terminal 4 and a demodulation circuit 5 demodulates the chroma signal C to generate R-Y color difference signal, G-Y color difference signal and B-Y color difference signal.

An amplifier 6 adjusts the depth of color on a screen by amplifying the R-Y color difference signal demodulated in the demodulation circuit 5 according to a control signal, and a matrix circuit 7 adds the R-Y color difference signal from the amplifier 6 and the brightness (Y) signal from the sharpness circuit 1 to generate an R primary color signal at a pin 8.

An amplifier 9 adjusts the depth of color on the screen by amplifying the G-Y color difference signal demodulated in the demodulation circuit 5 according to a control signal, and a matrix circuit 10 adds the G-Y color difference signal from the amplifier 9 and the brightness (Y) signal from the sharpness circuit 1 to generate a G primary color signal at a pin 11.

An amplifier 12 adjusts the depth of color on the screen by amplifying the B-Y color difference signal demodulated in the demodulation circuit 5 according to a control signal, and a matrix circuit 13 adds the B-Y color difference signal from the amplifier 12 and the brightness (Y) signal from the sharpness circuit 1 to generate a B primary color signal at a pin 14.

A Braun tube 21 is driven by amplifiers 18, 19 and 20 to display an image.

An IC tester 22 measures levels, phases, etc. appeared at pins 8, 11 and 14 of the semiconductor integrated circuit during manufacturing of the semiconductor integrated circuit, and inspects whether the semiconductor integrated circuit is manufactured to have the desired characteristics.

A microcomputer 23 controls the signal processing IC by calculating the adjustment values, selecting a station, displaying characters, etc., and a non-volatile memory (EEPROM, etc.) 24 stores data from the microcomputer 23.

DA converters 25, 26 and 27 convert digital signals from the microcomputer 23 to analog signals to adjust gains of the amplifiers 6, 9 and 12, respectively.

Next, operation of the circuit described above will be explained. The brightness (Y) signal from the terminal 2 added to the sharpness in the sharpness circuit 1 is applied to the matrix circuit 7.

On the other hand, the chroma signal C from the terminal 4 is amplified in BPA 3, followed by demodulation in the demodulation circuit 5. Amplitude of the demodulated R-Y color difference signal is adjusted in the amplifier 6, and depth of red color is modified. The R-Y color difference signal and the brightness (Y) signal from the sharpness circuit 1 are added in the matrix circuit 7 to generate red R primary color signal at the pin 8.

Amplitude of the G-Y color difference signal demodulated in the demodulation circuit 5 is adjusted in the amplifier 9, and depth of green color is modified. The G-Y color difference signal and the brightness (Y) signal from the sharpness circuit 1 are added in the matrix circuit 10 to generate green G primary color signal at the pin 11.

Amplitude of the B-Y color difference signal demodulated in the demodulation circuit 5 is adjusted in the amplifier 12, and depth of blue color is modified. The B-Y color difference signal and the brightness (Y) signal from the sharpness circuit 1 are added in the matrix circuit 13 to generate blue B primary color signal at the pin 14.

Herewith, each of primary color signals RGB is generated at each of the pins 8, 11 and 14, respectively. Signal processing up to the pins 8, 11 and 14 is performed within the signal processing IC for video signal. Levels, phases, frequencies, etc. of each of the primary color signals RGB generated at the pins 8, 11 and 14, respectively, are varied by the variations in manufacturing of the semiconductor integrated circuit.

Against this backdrop, the variations are adjusted and the adjustment values are stored in the memory 24 according to this invention. By shipping the signal processing IC together with the memory 24 storing the adjustment values, each of the signal processing ICs eventually show no variations due to the manufacturing. This can be easily implemented by combining the signal processing IC, the microcomputer and the memory (three separate chips) together in a single package.

Also, it can be implemented by integrating the signal processing IC, the microcomputer 23 and the memory 24 into a single semiconductor integrated circuit encapsulated in a single package. Furthermore, even when the signal processing IC, the microcomputer 23 and the memory 24 are made of three separate semiconductor integrated circuits and mounted on a single board, the effect of this invention can be obtained if the adjustment is made by a manufacturer of the board.

The circuit beyond the pins 8, 11 and 14 is composed of discrete elements, etc. in the TV receiver. The amplifiers 18, 19 and 20 amplify the primary color signals RGB and display an image on the Braun tube 21. The manufacturer of the semiconductor integrated circuits can easily find the variations from expected values of the level, phase, frequency, etc. of each of the primary color signals, by reading them generated at the pins 8, 11 and 14 with the IC tester 22.

Note that the tester 22 is an apparatus used in the production of the integrated circuits and is not a part of the semiconductor integrated circuit.

The data read by the IC tester 22 is sent to the microcomputer 23. The microcomputer 23 makes calculation and works out digital adjustment signals (gain adjustment signals of the amplifiers, in this case) and applies the digital adjustment signals to the D/A converters 25, 26 and 27. The digital adjustment signals are converted into analog signals in the D/A converter 25 to adjust the gain of the amplifier 6. Consequently, the level of the R-Y color difference signal applied to the matrix circuit 7 changes to modify the amplitude of the R primary color signal, i.e. the depth of color, appeared at the pin 8.

The adjustment loop consisting of the IC tester 22, the microcomputer 23 and the D/A converter 25 continues the adjustment until the amplitude of the R primary color signal reaches the desired value (expected value when there are no variations in manufacturing of the semiconductor integrated circuit). Resulting adjustment value is determined by the microcomputer 23 and stored in the memory 24. The adjustment value is preserved after shipping the semiconductor integrated circuit and mounting it into a TV receiver, when a non volatile memory is used as the memory 24.

Therefore the manufacturer of TV receivers does not need to consider the variations, even though the signal processing ICs have the variations due to manufacturing of the semiconductor integrated circuits.

The explanation given above is regarding the R-Y color difference signal. The same operations are made on the G-Y color difference signal and the B-Y color difference signal, and the digital adjustment signals are applied through the D/A converters 26 and 27 to the amplifier 9 and the amplifier 12.

The depth of color on the TV screen may be tailored to the TV receiver manufacturer's liking. In this case, when the TV receiver manufacturer applies adjustment signals determined by watching colors displayed on the Braun tube 21 to the microcomputer 23, the rest of the adjustment is made automatically as described above.

Figure 2A:
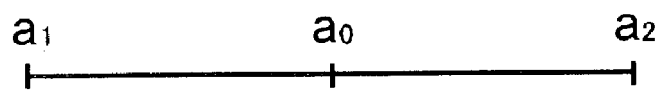
FIG. 2A, FIG. 2B and FIG. 2C show changes in characteristics of the semiconductor integrated circuit due to variations in manufacturing.
Figure 2B:
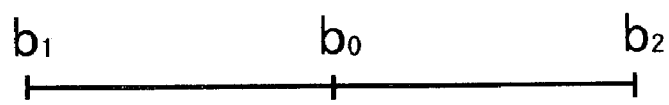
Figure 2C:
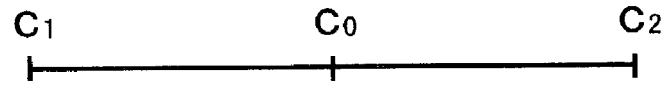

FIGS. 2A, 2B and 2C show an example of changes in characteristics due to variations in manufacturing of semiconductor integrated circuit. A center value a0, a minimum value a1 and a maximum value a2 of a primary color signal with no manufacturing variations are displayed in FIG. 2A. The values change to as displayed in FIG. 2B or FIG. 2C, with manufacturing variations. The device shown in FIG. 1 adjusts the changed values to the values shown in FIG. 2A.

There are various examples other than the example on the depth of color mentioned above. For example, amplitude of a detected output of a video signal varies among the semiconductor integrated circuits, while the amplitude is required to be 2V in most cases. The adjustment for it can be made by the method of this invention. This invention can be also applied to adjusting the tint.

A TV receiver usually includes a memory to store preset data for the microcomputer 23 or preset data for channel selection, and a portion of the memory can be used as the memory 24 to store the adjustment data. Also a microcomputer usually included in a TV receiver can be used as the microcomputer 23.

According to this invention, each of the signal processing circuits eventually shows no variations due to the manufacturing, since the memory storing the adjustment value and the signal processing circuit are combined together.

Since the signal processing circuit shows no variations, the electronic equipment manufacturer gets no additional burden and can reduce the adjustment process in the production line according to this invention.

And this invention can be implemented with no additional parts by utilizing existing parts (memory and microcomputer).

Furthermore, the adjustment can be made simultaneously for various characteristics including the depth of color, the amplitude of the detected output signal and the tint.

What is claimed is:

1. A semiconductor integrated circuit comprising:
   a microcomputer;
   a signal processing circuit which processes an input signal and outputs a processed signal according to a control signal from the microcomputer; and
   a memory to store an adjustment value to adjust change in a signal characteristic due to variations in manufacturing an element comprising the signal processing circuit,
   wherein the microcomputer adjusts the change in the signal characteristic of the signal processing circuit according to the adjustment value stored in the memory.

2. A semiconductor integrated circuit of the claim 1, wherein the microcomputer, the signal processing circuit and the memory are composed of separate semiconductor chips and housed in a single package.

3. A semiconductor integrated circuit of the claim 1, wherein the microcomputer, the signal processing circuit and the memory are composed of a single semiconductor chip.

4. A semiconductor integrated circuit of the claim 1, wherein the memory comprises an EEPROM.

5. A semiconductor integrated circuit of the claim 1, wherein the signal processing circuit is a signal processing circuit for a TV receiver.

6. A semiconductor integrated circuit of the claim 2, wherein the signal processing circuit is a signal processing circuit for a TV receiver.

7. A semiconductor integrated circuit of the claim 3, wherein the signal processing circuit is a signal processing circuit for a TV receiver.

8. An adjustment method of a semiconductor integrated circuit comprising:
   providing a microcomputer;
   providing a signal processing circuit which processes an input signal and outputs a processed signal according to a control signal from the microcomputer;
   providing a memory to store an adjustment value to adjust change in a signal characteristic due to variations in manufacturing an element comprising the signal processing circuit;
   storing the adjustment value in the memory before the semiconductor integrated circuit is shipped; and
   adjusting the change in the signal characteristic of the signal processing circuit with the microcomputer according to the adjustment value stored in the memory.

9. An adjustment method of the claim 8, further comprising determining the adjustment value with an IC tester during manufacturing of the semiconductor integrated circuit.

10. An adjustment method of the claim 8, wherein the memory comprises an EEPROM.

11. An adjustment method of the claim 9, wherein the memory comprises an EEPROM.

12. An adjustment method of the claim 8, wherein the signal processing circuit is a signal processing circuit for a TV receiver.

* * * * *